United States Patent [19]

Yokoyama

[11] Patent Number: 5,754,701
[45] Date of Patent: May 19, 1998

[54] IMAGE SIGNAL CODING METHOD

[75] Inventor: Yutaka Yokoyama, Tokyo, Japan

[73] Assignee: NEC Corporation, Tokyo, Japan

[21] Appl. No.: 395,529

[22] Filed: Feb. 28, 1995

Related U.S. Application Data

[63] Continuation of Ser. No. 103,686, Aug. 10, 1993, abandoned.

[30] Foreign Application Priority Data

Aug. 11, 1992 [JP] Japan .................. 4-213107
Aug. 11, 1992 [JP] Japan .................. 4-213108

[51] Int. Cl.$^6$ ........................................ G06K 9/36
[52] U.S. Cl. ........................................ 382/240; 382/234
[58] Field of Search ........................ 382/197–200, 382/203, 204, 232, 234, 236, 241–243, 316; 358/261.1, 261.2, 261.3, 261.4

[56] References Cited

U.S. PATENT DOCUMENTS

| | | | |
|---|---|---|---|
| 4,771,469 | 9/1988 | Wittenburg | 382/25 |
| 5,057,939 | 10/1991 | Kirk | 358/261.4 |
| 5,086,482 | 2/1992 | Kumagai | 382/25 |
| 5,150,431 | 9/1992 | Yoshida et al. | 382/22 |
| 5,159,645 | 10/1992 | Kumagai | 382/22 |

OTHER PUBLICATIONS

U. Franke, et al., "Region Based Image Representation with Variable Reconstruction Quality", SPIE, vol. 1001, 1988, pp. 178–186.

M. Gilge, et al., "Coding of Arbitrarily Shaped Image Segments Based on a Generalized Orthogonal Transform," Image Communication, vol. 1, pp. 153–180.

*Primary Examiner*—Michael T. Razavi
*Assistant Examiner*—Gerard Del Rosso
*Attorney, Agent, or Firm*—Foley & Lardner

[57] ABSTRACT

An image signal and a series of coordinates representing a contour of region of the image signal are input. In the first step, the region contour is approximated by a polygonal shape. In the second step, bits at addresses in a bit map memory corresponding to pixels within the approximated polygonal shape are made on. In the third step, coordinates indicative of apexes of the approximated polygonal shape are coded as first series of codes. In the fourth step, only image signals which are indicated by the bit map memory as existing within the approximated polygonal shape are coded as a second series of codes. In the fifth step, the first and second series of codes obtained in the third and fourth steps are multiplexed and output.

9 Claims, 8 Drawing Sheets

1

IMAGE SIGNAL CODING METHOD

This application is a continuation of application Ser. No. 08/103,686, filed Aug. 10, 1993, now abandoned.

BACKGROUND OF THE INVENTION

The present invention relates to a method of coding an image signal and, particularly, to a method of coding arbitrarily shaped image segments segmented according to local image characteristics of an image.

Recently, a coding method has been studied in which an image signal is segmented according to its local characteristics and a shape of each region segment and an image signal within the region shape are coded. For example, M. Gilge et al., "CODING OF ARBITRARILY SHAPED IMAGE SEGMENTS BASED ON A GENERALIZED ORTHOGONAL TRANSFORM," Signal Processing: Image Communication, Vol. 1 (1989), pp. 153–180, Elsevier Science Publishers B. V. (Reference 1) discloses a technique in which a prediction error signal predicted according to the motion-compensated interframe coding system is processed by thresholding and filtering operation to obtain region segments, those of the region segments of small size are connected to reduce the number of regions and a contour of each of the reduced number of regions is coded by using the chain code and at the same time an image within the contour is coded.

In the method disclosed in this article in which the contour of region is coded by using the chain code, an amount of code necessary to code the contour of region is considerable. In order to code the image signal, code is necessary to represent the contour and code is necessary to represent the image signal within the contour. Although the latter amount of code can be reduced by controlling quantizer characteristics, the former amount of code depends upon a content of the image. Therefore, the disclosed prior art is not suitable for a low bit rate coding method.

In order to reduce the contour information, one may consider approximating the contour by a polygonal shape and to code information indicative of the approximated polygonal shape. This method is disclosed in, for example, U. Franke et al., "Region Based Image Representation with Variable Reconstruction Quality," Visual Communications and Image Processing, Vol. 1001, (1986), pp. 178–186, (Reference 2). While an approximated polygon obtained by the Reference 2 method circumscribes a concave portion of the contour, it inscribes a convex portion of the contour. If the Reference 2 method is combined with the method of Reference 1, some of the pixels which are included in the convex portion of the region will be outside of the approximated polygon. Therefore, the Reference 2 method cannot be combined with that of Reference 1.

SUMMARY OF THE INVENTION

An object of the present invention is to provide a coding method for an image signal, which is capable of coding a contour of a region with a minimum amount of code and is suitable for a low bit rate coding.

The present invention resides in a method of coding a signal indicative of a contour of a region segment and an image signal within the contour, the method comprising:

a first step for approximating a region represented by information indicative of the contour of the region segment with a polygonal shape to obtain an information indicative of the approximated polygonal shape;

a second step for producing, on the basis of the information indicative of the approximated polygonal shape, a bit map indicative of whether or not respective picture elements of the image signal exist within the approximated polygonal shape;

a third step for coding information indicative of vertexes of the approximated polygonal shape;

a fourth step for coding the image signal which is indicated by the bit map memory as within the region segment; and a fifth step for multiplexing the coding information produced in the third and fourth steps.

BRIEF DESCRIPTION OF THE DRAWINGS

FIG. 4 is a flowchart explaining the operation of a first embodiment of a first converter circuit shown in FIG. 1;

DETAILED DESCRIPTION OF THE PREFERRED EMBODIMENTS

Figure 1:
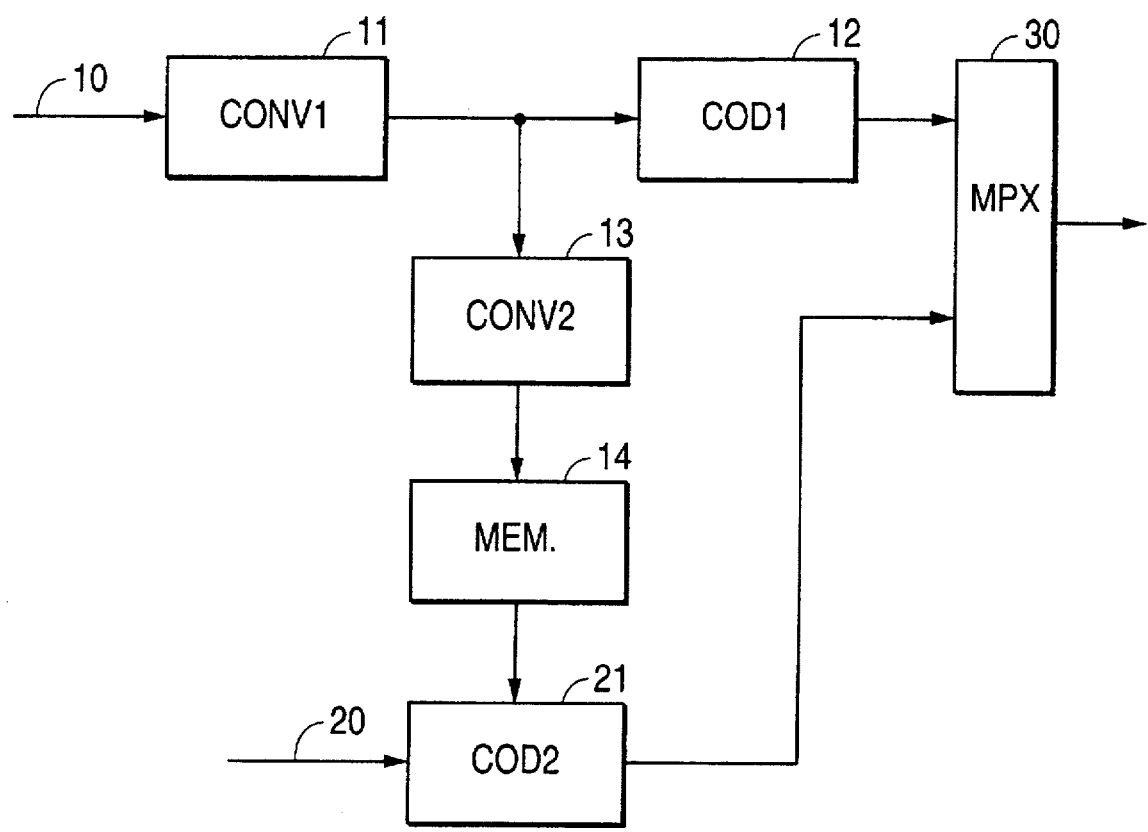
FIG. 1 is a block diagram showing a construction of an image signal coding device to which the present invention is applied.
Figure 2:
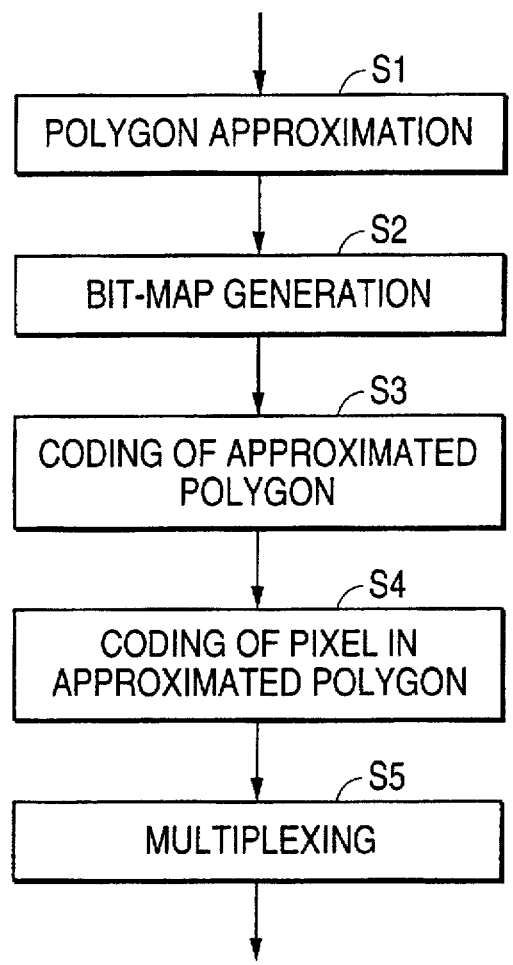
FIG. 2 is a flowchart for explaining an operation of the device shown in FIG. 1.

The construction and operation of an image signal coding device to which the present invention is applied will be described first with reference to FIGS. 1 and 2. The image signal coding device comprises, as shown in FIG. 1, a first converter circuit 11 responsive to a signal 10 indicative of a contour of a region segment outputs a signal train indicative of vertexes of an approximated polygonal shape circumscribing the region segment. A first coder 12 codes the signal train indicative of the vertexes of the approximated polygonal shape. A bit map memory 14 has the capacity corresponding to one frame of the image signal. A second converter circuit 13 turns on bits of the bit map memory 14 corresponding to pixel positions within the approximated polygonal shape according to the signal train indicative of the vertexes of the approximated polygonal shape. A second coder 21 codes and outputs only those of the image signals supplied by a signal line 20 which are within the approximated polygonal shape according to a bit map information output from the bit map memory 14, and a multiplexer 30 for multiplexes the outputs of the first coder 12 and the second coder 21 and outputs it on a transmission line.

An operation of the coding device shown in FIG. 1 will be described with reference to a flowchart shown in FIG. 2. In the step S1, a signal indicative of a region segment is supplied to the first converter circuit (CONV 1) 11. As the segment indicative signal, coordinates of vertexes of the region segment contour are given in counterclockwise sequence. As will be described later, the first converter circuit 11 serves to obtain an approximated polygonal shape circumscribing the region segment from a signal indicative of the region segment and outputs information indicative of the approximated polygonal shape, e.g., coordinates of vertexes of the approximated polygonal shape, in a counterclockwise sequence. The information indicative of the approximated polygonal shape is supplied to the first coder 12 and the second converter circuit 13.

In the step S2, the second converter circuit 13 turns the approximated polygonal information into a bit map which indicates whether each pixel of the image is located within the approximated polygon or not, and stores the bit map in the bit map memory 14. Since a microprocessor containing software which is known in the field of computer graphics for coloring an inside region of a closed region can be used as the second converter circuit 13, details thereof are omitted.

Then, in the step S3, the first coder (COD 1) 12 codes the coordinates of the input apexes, or vertexes of the approximated polygonal shape and outputs them. In coding and outputting the apex coordinates, information indicative of the number of apexes of the approximated polygonal shape is also coded and output. Further, in coding the apexes of the approximated polygonal shape, it is possible to code a first vertex by means of the first coder 12 and to code each of a second and subsequent apexes by coding a vector indicative of a difference in coordinates from those of a preceding apex, i.e., vector indicative of each side of the approximated polygonal shape. This scheme will be described in more detail with reference to FIG. 3.

Figure 3:
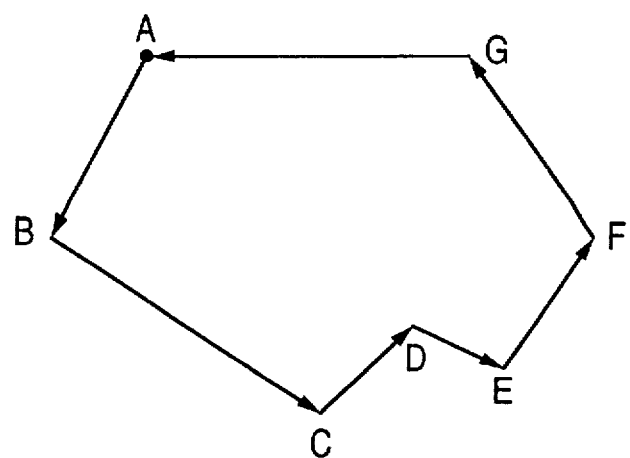
FIG. 3 shows an example of an approximated polygonal shape.

FIG. 3 shows an example of the approximated polygonal shape. In this example, the first coder 12 is supplied with an information indicative of coordinates of apexes A, B, C, D, E, F and G in a counterclockwise sequence. First, the first coder 12 codes coordinates of the first apex A. When a screen size of an image signal is, for example, 512 (scan lines)×512 (picture elements), x and y coordinates of the first apex A are coded as 9 bits, respectively, i.e., the number of bits necessary to represent a pixel locatio is 9 bits each for the x and y coordinates. Then, variable length coding is performed for vectors $\vec{AB}, \vec{BC}, \vec{CD}, \ldots, \vec{GA}$ in the sequence. In the variable length coding, a short length code is assigned to a vector whose absolute value is small and a long length code is assigned to a vector whose absolute value is large because, in general, the greater the absolute value, the less its occurrence probability. Since a length of each side of the approximated polygonal shape is very small compared with the image size, almost all of the vectors $\vec{AB}, \vec{BC}, \ldots, \vec{GA}$ can be represented by a smaller number of bits than the number of bits necessary to represent coordinates within the image (in the case of image whose size is 512×512, 18 bits).

Returning to FIGS. 1 and 2, a control signal indicating whether an image signal 20 is a picture element signal within (ON) or without (OFF) the approximated polygonal shape is supplied from the bit map memory 14 to the second coder 21 in synchronism with the image signal 20. In the step S4, the second coder 21 codes the image signal supplied thereto only when the control signal is ON and outputs it. The coding system used in the second coder 21 may be any of interframe coding, motion compensation interframe coding and orthogonal transform disclosed in Reference 1. Further, it is possible to constitute the second coder 21 with only a variable length coder and directly supply thereto a prediction error signal produced by interframe coding or motion compensation interframe coding.

In the step S5, the multiplexer 30 multiplexes the approximated polygonal shape information coded by the first coder 12 and the image signal coded by the second coder 21 and supplies it to the transmission line or a recording medium, etc.

Now, the first converter circuit will be described in more detail. The first converter circuit may be constituted with a microcomputer operable according to a flowchart to be described later.

Figure 4A:
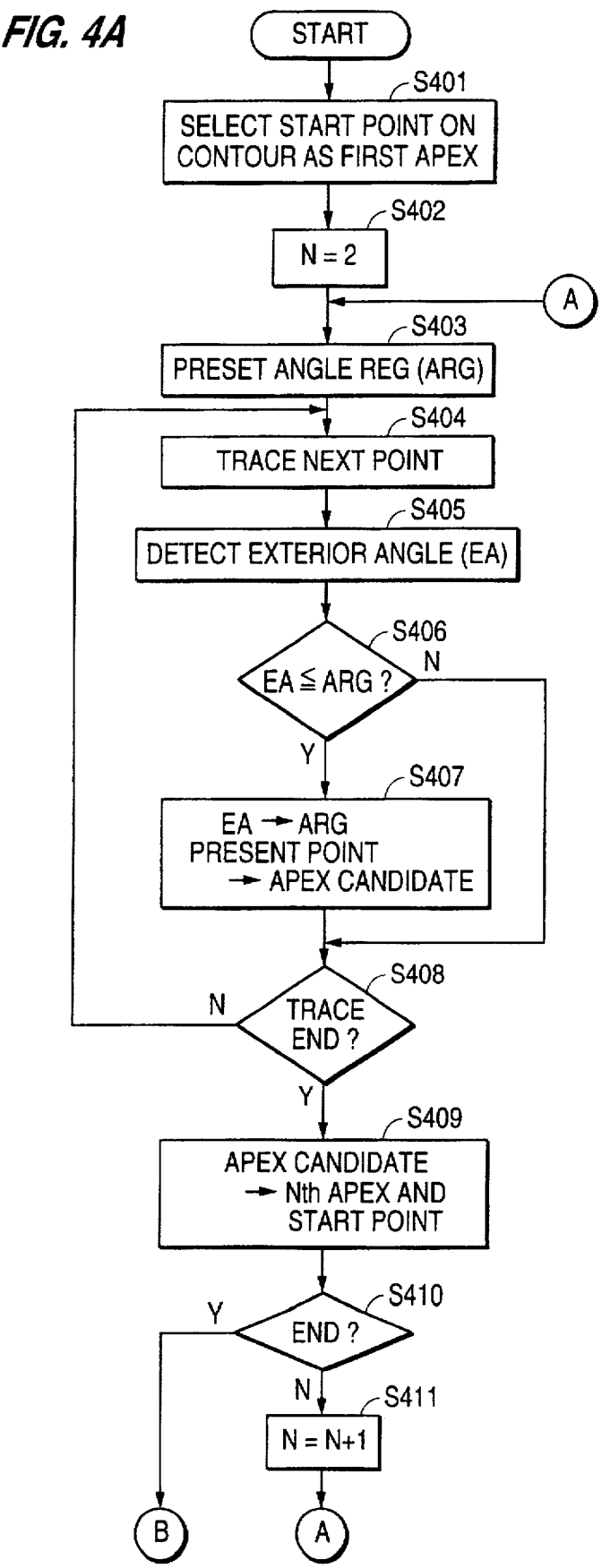
FIG. 4A shows an operation in its first stage and FIG. 4B shows an operation in its second stage.
Figure 4B:
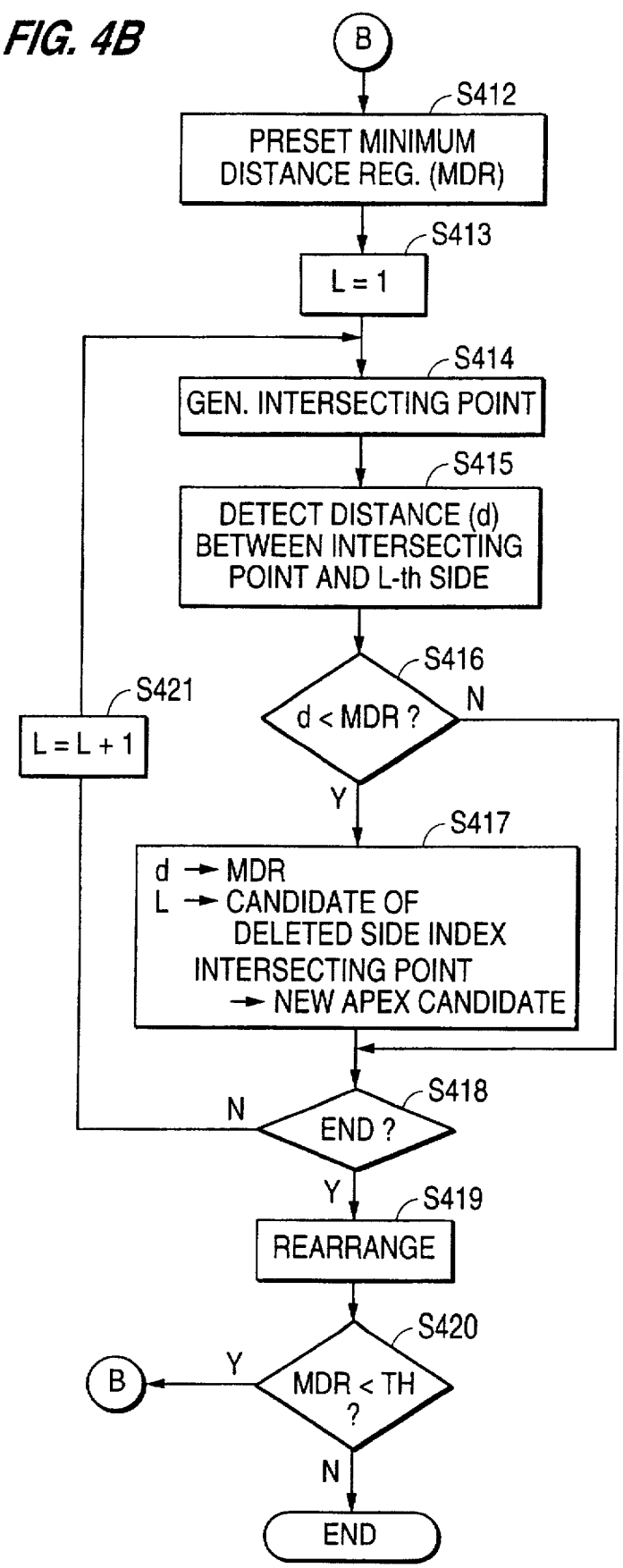
Figure 5:
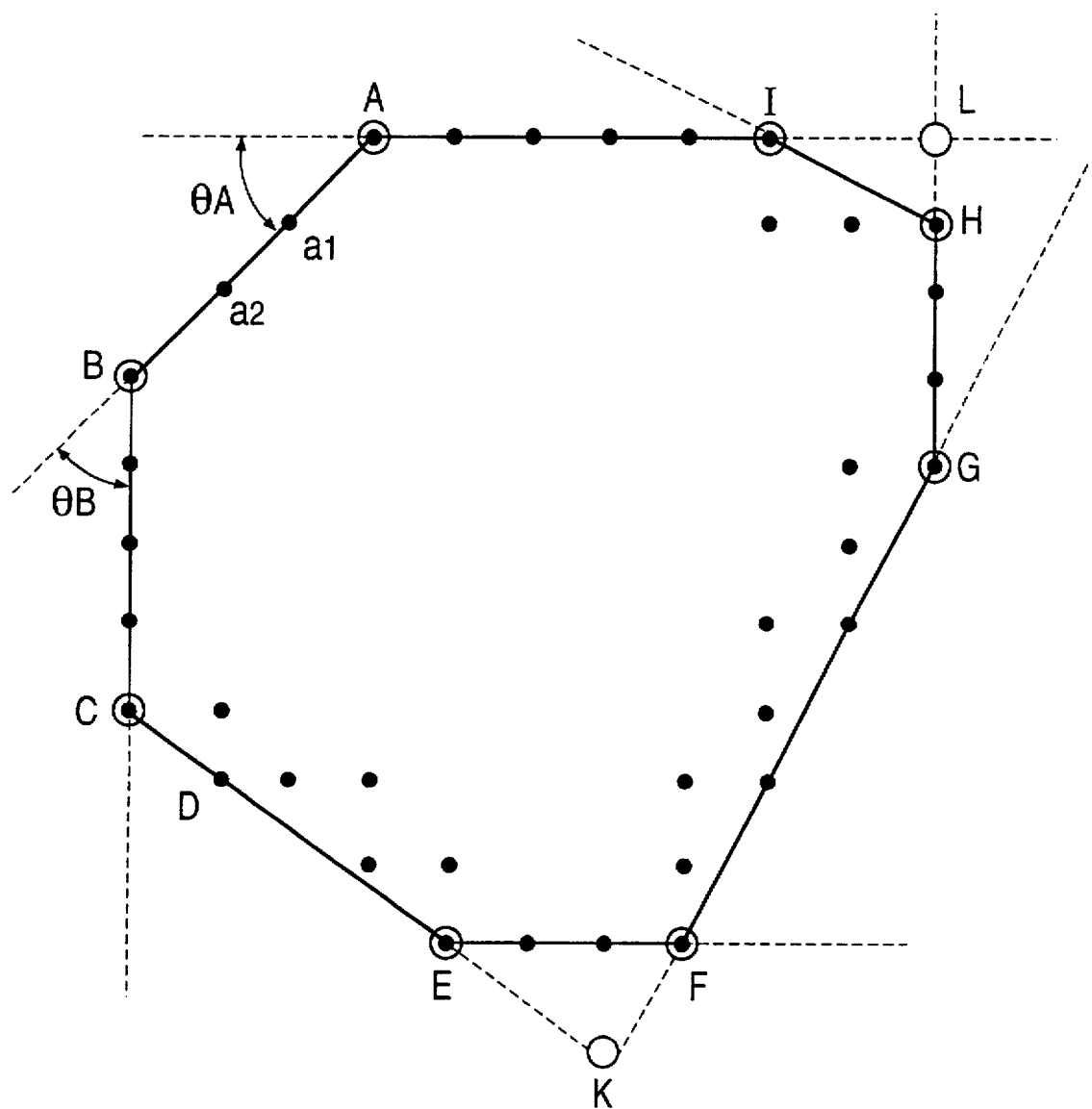
FIG. 5 shows an example of approximated polygonal shape produced by the first embodiment of the first converter circuit.

A first embodiment of the first converter circuit 11 will be described with reference to FIGS. 4A, 4B and 5. FIGS. 4A and 4B show flowcharts explaining the first embodiment of the first converter circuit 11 and FIG. 5 illustrates production of an approximated polygonal shape by means of the first embodiment.

Before describing the flowchart in FIGS. 4A and 4B, the operation will be described schematically by taking production of the approximated polygonal shape shown in FIG. 5 as an example. In FIG. 5, black points represent coordinates forming a contour of a region of an image signal. First, in a first stage processing shown in FIG. 4A, a first approximated polygonal shape ABCDEFGHI is obtained. Although the first approximated polygonal shape approximates the contour of the region substantially accurately as shown in FIG. 5, the number of sides is still large and many coding bits are required to code apexes A, B, C, D, E, F, G, H and I. In a second stage shown in FIG. 4B, a second approximated polygonal shape ABCKGL is produced by extending adjacent two sides, for example, AI and GH and FG and CE, and deleting sides EF and HI which are not substantially degrading the approximation of the contour of the region. The number of sides of the second approximated polygonal shape is smaller than that of the first approximated polygonal shape and thus the number of coding bits is smaller, although approximation accuracy may be slightly lower. This means that the number of bits necessary for an image signal to be coded by approximating the contour of the region does not increase much.

Now, the processing in the first stage shown in FIG. 4A will be described. It is assumed that coordinate information showing the contour of the region defined by the black points in FIG. 5, for example, is being input to the first converter circuit 11 in a counterclockwise sequence.

In the step S401, one point on the contour of the region is selected as the first apex. In selecting the first apex practically, the coordinate (of the point A in the example shown in FIG. 5) supplied first to the first converter circuit 11 can be selected as the first apex. Alternatively, it may be possible to select a point which is an uppermost and leftmost point on the contour as the first apex. In the step S402, N is set to 2. As will be described in detail later, N corresponds to an apex number of the first approximated polygonal shape.

In the step S403, an angle register (ARG) for storing minimum exterior angle is preset to, for example, 360°. Then, in the step S404, a point on the contour is obtained as an aimed point by moving from the first apex A by one in a counterclockwise direction. In the example shown in FIG. 5, this aimed point is $a_1$. In the step S405, an exterior angle measured at the first apex A between a reference side AI and a line segment connecting the first apex A and the aimed point $a_1$. In this case, since the reference side AI necessary to measure the exterior angle at the apex A is uncertain, a horizontal line passing through the apex A is assumed as the reference line. For example, an exterior angle $\theta_B$ of a side BC at a start point B is obtained by the following equation:

$$|\theta_B|=\cos^{-1}\{(\vec{BC},\vec{AB})/(|\vec{BC}|\cdot|\vec{AB}|)\} \quad (1)$$

where $(\vec{BC}, \vec{AB})$ is an inner product of vectors $\vec{BC}$ and $\vec{AB}$ and a value within a range 0–180° is employed as a result of operation of $\cos^{-1}\{\ \}$. In addition, the sign of $\theta_B$ is defined by that of outer product of $\vec{BC}$ and $\vec{AB}$.

In the step S406, the exterior angle $\theta_A$ is compared with the minimum exterior angle stored in the angle register (ARG). When the exterior angle $\theta$ is not larger than the stored minimum angle, the processing in the first converter circuit 11 is shifted to the step S407. Otherwise, it is shifted to the step S408. In the step S407, the exterior angle $\theta A$ obtained in the step S405 is stored in the angle register (ARG) and coordinates of the aimed point are stored in an apex candidate memory correspondingly to the numerical value N.

In the step S408, it is determined whether the aimed point traced the contour of the region completely. This determination is performed by determining whether the aimed point coincides with the first apex (point A in the example shown in FIG. 5). When the tracing is incomplete, the processing in the first converter circuit 11 is returned to the step S404. When the tracing is complete, the processing is shifted to the step S409.

Once the processing is shifted to the step S409, the apex candidate stored in the apex candidate memory corresponding to the numerical value N is determined as an Nth apex of the first approximated polygonal shape. Further, in the step S409, the Nth apex is set as a new start point and then the processing is shifted to the step S410.

In the step S410, it is decided whether all apexes of the first approximated polygonal shape are determined, that is, whether or not a detection of the first approximated polygonal shape is completed. This decision is performed by determining whether the Nth apex defined in the step S409 coincides with the first apex. When it is decided in the step S410 that all apexes of the first approximated polygonal shape are not determined as yet, the processing is shifted to the step S411 and the value N is incremented by one. Thereafter, the process is returned to the step S403 and the apex detection process for the first approximated polygonal shape continues, so that (N−1) apexes of the first approximated polygonal shape are determined. The process in the step S403 may be performed between the steps S410 and S411.

The processing in the second stage of the first embodiment of the first converter circuit 11 will be described with reference to FIG. 4B.

In the step S412, a minimum distance register (MDR) contained in the first converter circuit 11 is preset to a value corresponding to an allowable approximation error. Then, in the step S413, a value L indicative of the side number of the first approximated polygonal shape is set to 1. A side indicated by the side number L is defined as a side between an L-th apex and a (L+1)th apex of the first approximated polygonal shape.

In the step S414, an intersecting point of an extension line of the (L+1)th side and the (L−1)th side is obtained. When the value (L+1) exceeds the value (N−1), the value (L+1) is deemed as (L+1)−(N−1)=L−N+2. When (L−1) is 0, the value (L−1) is deemed as (N−1) which has been stored in an apex number register contained in the first converter circuit 11.

Assuming coordinates of the apexes A, B, C and D in FIG. 5 as $(X_A, Y_A)'$ $(X_B, Y_B)'$ $(X_C, Y_C)$ and $(X_D, Y_D)'$ respectively, coordinates of the intersecting point of the extension lines of the sides AB and DC are obtained by the following simultaneous equation:

$$(X_A-X_B)(Y-Y_A)=(Y_A-Y_B)(x-X_A)(X_C-X_D)(Y-Y_C)=(Y_C-Y_D)(x-X_C) \quad (2)$$

It is assumed that the coordinates of the intersecting point obtained by solving this simultaneous equation are $\hat{x}, \hat{y}$. When the sides AB and CD are parallel to each other, it becomes $$(X_A-X_B)(Y_C-Y_D)-(X_C-X_D)(Y_A-Y_B)=0 \quad (3)$$

and therefore it is impossible to obtain the intersecting point. In this case, in the step S414, an overflow flag is set to "1" without performing the operation for obtaining the intersecting point and the process is shifted to the step S415.

In the step S415, a distance d between the intersecting point $(\hat{x}, \hat{y})$ of the extension lines of the side (L−1) and the side (L+1) which was obtained in the step S414 and the side L is obtained. In the case where the overflow flag is set in the step S413, the distance d is set to a maximum possible value (for example, the number of picture elements corresponding to a length of diagonal line of a screen). Since the method of obtaining the distance d when the sides (L−1) and (L+1) are not in parallel to each other is well known, details thereof are omitted.

Then, in the step S416, the distance d obtained in the step S415 is compared with the value stored in the minimum distance register (MDR). If the distance d is smaller than the stored value, the process in the first converter circuit 11 is shifted to the step S417, otherwise, to the step S418.

In the step S417, the distance d is stored in the minimum distance register and an index L is stored in a deleting side candidate index memory contained in the first converter circuit 11, as a candidate of a side to be deleted. Further, the intersecting point obtained in the step S414 is stored in a new apex candidate memory contained in the first converter circuit 11 corresponding to the index L, as a candidate of a new apex.

In the step S418, it is determined whether all sides of the first approximated polygonal shape are processed. This determination is performed by determining whether the value of the index L coincides with the value stored in the side number register. If all sides are processed, the process in the first converter circuit 11 is shifted to the step S419. If not, the index L is incremented in the step S421 and then the process is returned to the step S414 to continue processing the sides which are not processed yet.

In the step S419, a central processing unit (CPU) which is a main portion of the first converter circuit 11 refers to the index which is the candidate of side to be deleted and is stored in the deletable side candidate index memory, deletes an apex to be deleted among the series of apexes of the first approximated polygonal shape which are stored in the apex candidate memory and inserts the new apex stored in the new apex candidate memory into the apex candidate memory. In more detail, when an index L1 is stored in the deletable side candidate memory, the L1-th and the (L1+1)th apexes are deleted from the apex candidate memory and, instead thereof, the new apex which is stored in the new apex candidate memory corresponding to the index L1 is stored in a working memory contained in the first converter circuit 11. Apexes which are not deleted are transferred to the working memory as they are. Thereafter, the content of the working memory is transferred to the apex candidate memory. In this manner, the apexes of the first approximated polygonal shape which are not deleted and the apex produced through the steps S413 to S418 are stored in the apex candidate memory in a counterclockwise sequence. Describing this with reference to the example shown in FIG. 5, the apexes E, F, H and I are deleted from the apexes A, B, C, D, E, F, G, H and I of the first approximated polygonal shape and, instead thereof, new apexes K and L are inserted by means of the processing in this second stage. Thus, the apexes A, B, C, K, G and L are stored in the apex candidate memory.

After termination of the processing in the step S419, the process in the first converter circuit 11 is shifted to the step S420. In the step S420, the value of the minimum distance register (MDR) is compared with a predetermined threshold value (TH). This threshold value corresponds to a permissible approximation error of a region contour. The case where the value of the minimum distance register (MDR) is smaller than the threshold value means that the approximation error is small and apexes which can be deleted still remain. When the result of comparison in the step S420 indicates that the value of the MDR is smaller than the threshold value, the process in the first converter circuit is returned to the step S412 and the second stage processing is performed for, in the case shown in FIG. 5, the polygon ABCKGL.

When it is determined as MDR≧TH in the step S420, the second stage processing is terminated and a series of coordinates of the apexes stored in the apex candidate memory are supplied to the first coder 12 and to the second converter circuit in FIG. 1.

Figure 6:
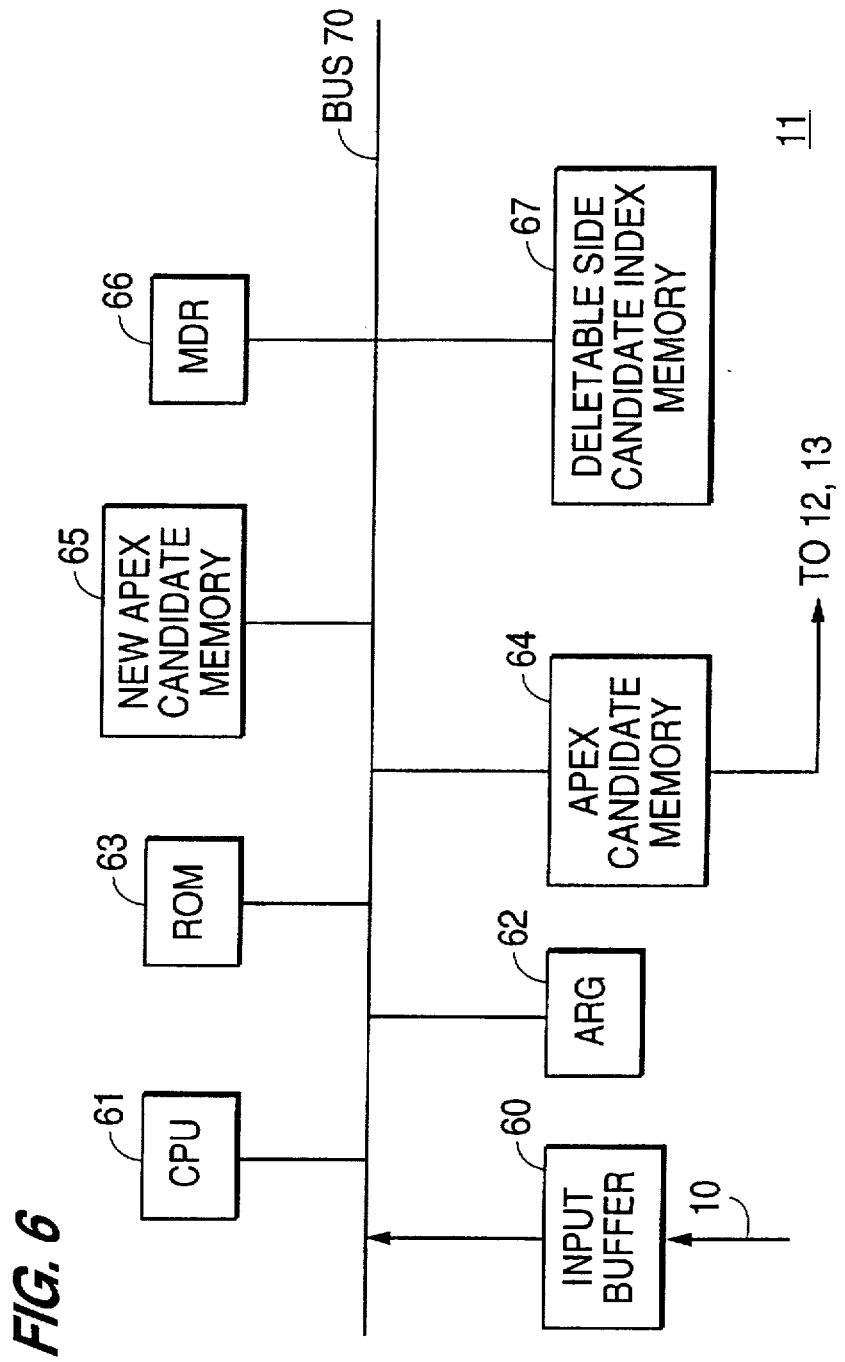
FIG. 6 is a block diagram of the first embodiment of the first converter circuit.

Although the substantial construction of the first embodiment of the first converter circuit 11 will be clear from the description above, FIG. 6 shows an example thereof. In FIG. 6, the first converter circuit 11 includes the CPU 61 for performing the processes shown in FIGS. 4A and 4B, an input buffer 60 for temporarily storing the coordinates signal 10 indicative of a region contour, the angle register (ARG) 62, a ROM 63 storing the program of the CPU 61, the apex candidate memory 64, the new apex candidate memory 65, the minimum distance register (MDR) 66, the deletable side candidate index memory 67 and a bus 70 connecting these circuits.

As described, according to the first embodiment, the region contour can be approximated by a polygon having smaller number of sides provided that the contour has no considerable concave portion. Therefore, it is possible to substantially reduce an amount of information necessary to define the contour. Further, since approximation error of the region contour of the approximated polygon is slight, there is no substantial increase of the number of coding bits of an image signal within the approximated polygon, resulting from this approximation.

In a case where there is considerable concave shapes in the region contour, however, approximation error of the contour of the approximated polygon might be increased. In such case, the number of coding bits of the image signal within the approximated polygon might increase beyond the merit of reduction of the contour information. This defect can be solved by a second embodiment to be described below.

Figure 7:
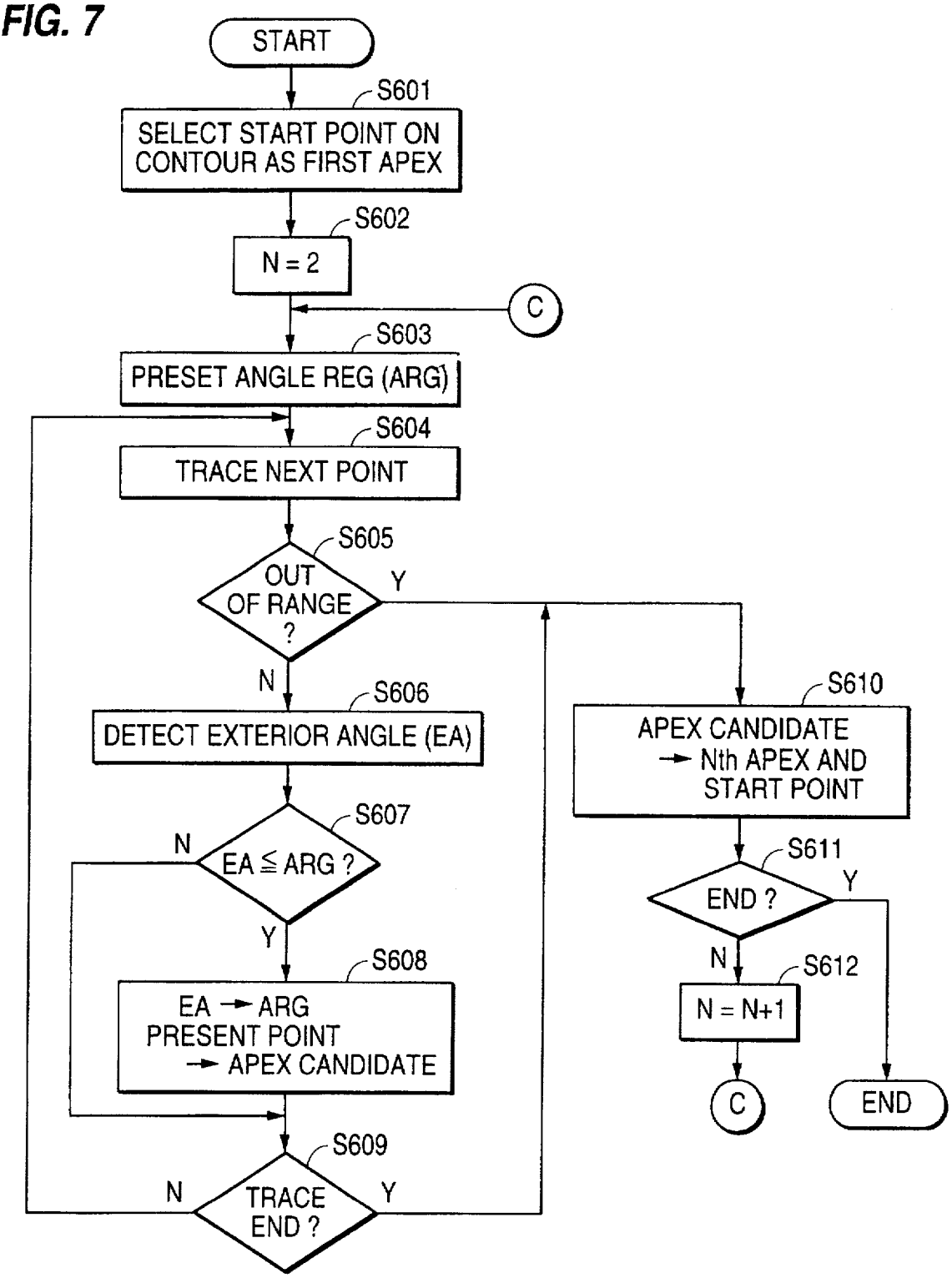
FIG. 7 is a flowchart explaining the operation of a second embodiment of a first converter circuit.

The second embodiment of the first converter circuit 11 is shown in FIG. 7. It should be noted that, in the second embodiment, the series of coordinates signals indicating the contour of the region are input in a counterclockwise sequence as in the first embodiment.

In the step S601, a coordinate input first to the first converter circuit 11 defines a start point as a first apex. Then, in the step S602, an index N indicative of apexes of an approximated polygonal shape is set to 2. An operation in the step S604 is similar to that in the step S404 in FIG. 4.

In the step 605, it is determined whether a distance between the start point and an aimed point is larger than a threshold value r. If NO, the process in the first converter circuit 11 is shifted to the step S606 or, if YES, it is shifted to the step S610. An operation from the step 607 to the step S612 is similar to that from the step S406 to the step S411 in FIG. 4. Therefore, its detailed explanation is omitted.

Figure 8:
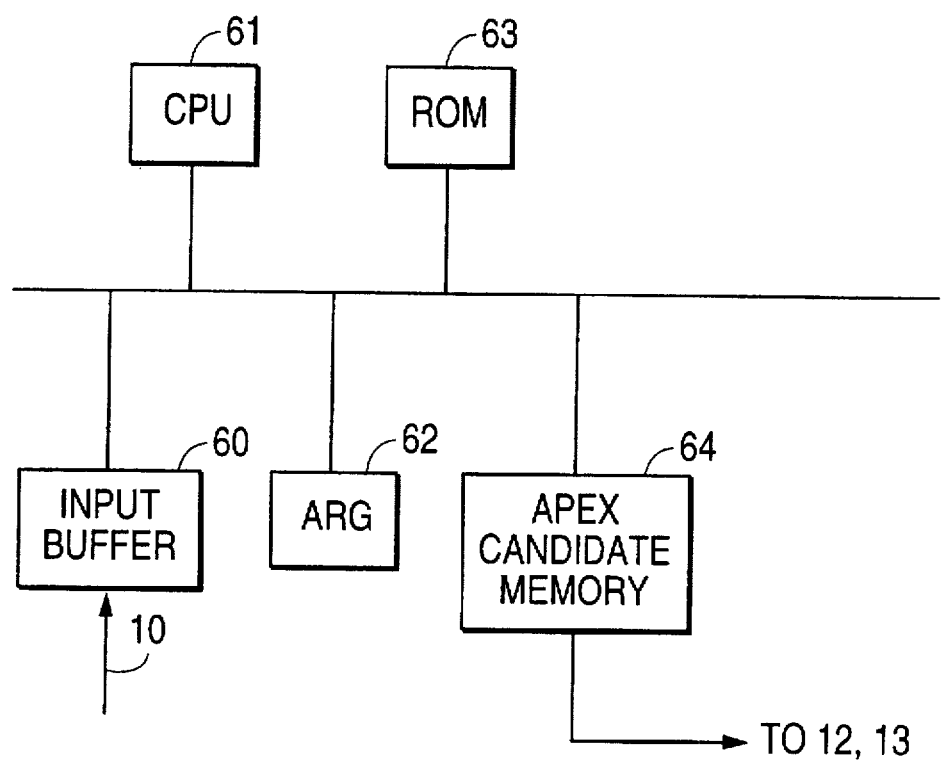
FIG. 8 is a block diagram showing the second embodiment of the first converter circuit.

As will be clear from the above description, in the second embodiment whose construction is as shown in FIG. 8, approximation error caused by significant concave shapes of a contour of an approximated polygonal shape is reduced by restricting a length of side of the approximated polygon to be detected to a value equal to or smaller than the constant value r.

The second embodiment shown in FIG. 7 improves the processing in the first stage of the first embodiment shown in FIG. 4A. In the second embodiment, it is possible, in order to reduce the number of sides of the approximated polygon, to perform the process shown in FIG. 4B subsequent to the processing shown in FIG. 6.

As described in detail hereinbefore, the present invention can reduce the number of bits necessary for coding of a region contour without substantially increasing the number of bits necessary for coding of an image signal within the region, by approximating a region shape of the image signal by a polygonal shape.

What is claimed is:

1. An image signal coding method for encoding a contour region obtained by image segmentation and for encoding image signals within a segmented region using a data processing unit programmed to carry out the following steps:

(1) receiving electrical signals representative of a plurality of pixel locations of a contour of said segmented region as a first pixel location information;

(2) approximating said contour by a polygon;

(3) producing electrical signals representing an apex sequence of said polygon as a second pixel location information;

(4) encoding said second pixel location information into electrical signals representative of a first code sequence;

(5) receiving electrical signals representative of a plurality of pixel locations of said image signals within said segmented region;

(6) producing a bit map, which indicates whether or not each pixel location of said image signal is located within said polygon;

(7) encoding the electrical signals representative of said pixels included in said polygon based on said bit map into electrical signals representative of a second code sequence; and (8) multiplexing the electrical signals representative of said first code sequence and the electrical signals representative of said second code sequence;

wherein said steps (1)–(3) comprise the steps of:

(a) receiving said pixel locations of said contour of said segmented region, selecting one of a first of said pixel locations as a first apex of said polygon and storing said first apex in a start point memory;

(b) storing said first apex in an apex memory and setting a value N to 2;

(c) defining a horizontal line as a reference line;

(d) storing a maximum value of a minimum exterior angle into a minimum exterior angle register;

(e) selecting a next point of said pixel locations;

(f) measuring an exterior angle at the (N−1)-th apex by using the reference line and a line connecting between said next point and the apex;

(g) comparing the measured exterior angle with the minimum exterior angle register value, and if the measured exterior angle is less than the minimum exterior angle register value, storing the measured exterior angle in the minimum exterior angle register and storing the location of said next point as an apex candidate of the polygon;

(h) returning to the step (e), if the next point is not a start point stored in said start point memory;

(i) determining said candidate as an N-th apex of said polygon and incrementing said value N by one;

(j) changing the reference line to a line connecting said N-th apex and an (N−1)-th apex; and (k) if the lines connecting an (n−1)-th apex and an n-th apex (n=2, 3, - - - , N) forms a closed region, outputting locations of said first to (N−1)-th apex as said second pixel location information and going to step (4); if not, returning to step (d).

2. The image signal coding method as claimed in claim 1, wherein said method further comprises the steps of:

(l) reading locations of said first to Lo-th apex, where Lo=N−1.

(m) storing a maximum number of a minimum distance in a minimum distance register and setting a value L to 1, said maximum number being a maximum value of said minimum distance;

(n) defining a L-th line passing through said L-th apex and (L+1)-th apex, defining an (L+1)-th line passing through said (L+1)-th apex and said (L+2)-th apex, and defining an (L+2)-th line passing through said (L+2)-th apex and said (L+3)-th apex, where, if (L+l) (l=1, 2, 3) exceeds said Lo, (L+l) equals (L+l−Lo);

(o) detecting an intersecting point of L-th line and (L+2)-th line;

(p) measuring a distance between said intersecting point and said (L+1)-th line;

(q) if said distance is smaller than a value of said minimum distance register, storing said distance in said minimum distance register and storing locations of said (L+1)-th apex and said (L+2)-th apex in a deletable apex memory as candidates to be deleted and defining said intersecting point as a new apex;

(r) if L is smaller than Lo, incrementing L by one and returning to the step (n), otherwise going to a next step (s);

(s) rearranging said first to Lo-th apex by deleting said candidates to be deleted from said first to Lo-th apex and by inserting said new apex into said first-to-Lo-th apex;

(t) if a value of said minimum distance memory is smaller than a predetermined threshold, setting said value Lo to a number of rearranged apexes in said step (s), and returning to said step (m), and if not, outputting locations of said rearranged apexes in said step (s) as said second pixel location information and going to said step (4).

3. The image coding method as claimed in claim 1, further comprising the following steps between said steps (f) and (g):

(f-1) measuring a distance between said selected point and a location stored in said start point memory; and (f-2) if said distance is larger than a predetermined threshold length, going to said step (i), otherwise, going to said step (g).

4. An image signal processor which encodes a contour region obtained by image segmentation and image signals within said contour region, comprising:

a first converter circuit for receiving a signal indicative of said contour region and generating an apex sequence of a polygon approximating said contour region;

a first coder for encoding said apex sequence into a first code sequence;

a second converter circuit for converting said apex sequence into a bit map representative of said polygon;

a second coder, adapted to receive image signals and said bit map, for encoding into a second code sequence only those image signals which are within said bit map; and a multiplexer for multiplexing said first code sequence and said second code sequence said first converter circuit comprising:

(a) an input buffer for temporarily storing an image signal of the contour region;

(b) a central processor unit for carrying out programmed steps for determining said polygon;

(c) a read-only memory for storing said programmed steps;

(d) an angle register for storing exterior angles of said polygon;

(e) an apex candidate memory for storing target values for said apex sequence;

(f) a new apex candidate memory for storing updated values for said apex sequence;

(g) a minimum distance register for storing a distance between a side L and an imaginary point of intersection between sides L−1 and L+1;

(h) a deletable side candidate index memory for storing an index of a side candidate to be deleted; and (i) a bus connecting elements (a)–(h) of said first converter circuit.

5. An image signal processor as recited in claim 4, further comprising a bit map memory for storing said bit map representative of said polygon.

6. An image signal processor as recited in claim 4, further comprising a programmed microprocessor controlling said first converter circuit and second converter circuit.

7. An image signal processor as recited in claim 4, further comprising a bit map memory for storing said bit map representative of said polygon.

8. An image signal processor as recited in claim 4, further comprising a programmed microprocessor controlling said first converter circuit and second converter circuit.

9. An image signal processor which encodes a contour region obtained by image segmentation and image signals within said contour region, comprising:

a first converter circuit for receiving a signal indicative of said contour region and generating an apex sequence of a polygon approximating said contour region;

a first coder for encoding said apex sequence into a first code sequence;

a second converter circuit for converting said apex sequence into a bit map representative of said polygon;

a second coder, adapted to receive image signals and said bit map, for encoding into a second code sequence only those image signals which are within said bit map; and a multiplexer for multiplexing said first code sequence and said second code sequence;

said first converter circuit comprising:
  (a) an input buffer for temporarily storing an image signal of the contour region;
  (b) a central processor unit for carrying out programmed steps for determining said polygon;
  (c) a read-only memory for storing said programmed steps;
  (d) an angle register for storing exterior angles of said polygon;
  (e) an apex candidate memory for storing target values for said apex sequence; and
  (f) a bus connecting elements (a)–(e) of said first converter circuit, wherein lengths of sides of said polygon are restricted to be less than or equal to a predefined constant value.

* * * * *